(12) United States Patent
Altman

(10) Patent No.: US 11,534,035 B2
(45) Date of Patent: Dec. 27, 2022

(54) FINGER WIPER

(71) Applicant: Chen Altman, Katzir (IL)

(72) Inventor: Chen Altman, Katzir (IL)

( * ) Notice: Subject to any disclaimer, the term of this patent is extended or adjusted under 35 U.S.C. 154(b) by 79 days.

(21) Appl. No.: 16/990,209

(22) Filed: Aug. 11, 2020

(65) Prior Publication Data

US 2021/0059483 A1 Mar. 4, 2021

(30) Foreign Application Priority Data

Aug. 27, 2019 (IL) .......................................... 268961

(51) Int. Cl.
*F26B 5/14* (2006.01)
*A47K 10/00* (2006.01)

(52) U.S. Cl.
CPC ................ *A47K 10/00* (2013.01); *F26B 5/14* (2013.01)

(58) Field of Classification Search
CPC ..... D06F 3/00; D06F 3/02; D06F 3/04; A47K 10/00; A47K 3/004; F26B 5/14; H04M 1/18; H04M 1/6721; H04M 2250/12
USPC .......................................... 34/523, 397, 400
See application file for complete search history.

(56) References Cited

U.S. PATENT DOCUMENTS

| 7,431,983 | B2 | 10/2008 | Amano |
| D782,460 | S | 3/2017 | Bertrand et al. |
| 10,189,056 | B1 | 1/2019 | Krause et al. |
| 11,272,781 | B2 * | 3/2022 | Rose ..................... A46B 13/001 |
| 2006/0068833 | A1 * | 3/2006 | Cohn .................. H04M 1/0283 455/575.1 |
| 2006/0242780 | A1 | 11/2006 | Yang et al. |
| 2013/0276251 | A1 | 10/2013 | Guynn et al. |
| 2014/0345074 | A1 | 11/2014 | Lee |
| 2015/0096135 | A1 * | 4/2015 | Rosenzweig ...... A46B 15/0061 15/105 |
| 2015/0190029 | A1 | 7/2015 | Haarburger |
| 2017/0071330 | A1 | 3/2017 | Gross et al. |
| 2017/0318946 | A1 | 11/2017 | Davidson et al. |

FOREIGN PATENT DOCUMENTS

| CN | 3100959 | 2/1999 |
| CN | 301018876 S | 9/2009 |
| CN | 301991183 | 7/2012 |
| CN | 302734059 | 2/2014 |
| CN | 204046668 U | 12/2014 |
| CN | 104658050 A | 5/2015 |
| CN | 204408412 U | 6/2015 |
| CN | 303355321 | 9/2015 |
| CN | 303449440 S | 11/2015 |

(Continued)

OTHER PUBLICATIONS

"A Microfiber Cell Phone Screen Cleaner and Kickstand", https://gwee.com/shop/gwee-button/, 2019, 7.

(Continued)

*Primary Examiner* — John P McCormack
(74) *Attorney, Agent, or Firm* — Dorsey & Whitney LLP

(57) ABSTRACT

A finger wiping device having a base portion and a wiping portion, the wiping portion extending over at least a portion of the base portion and configured with a plurality of flexible wiping elements extending from a top face of the base portion, the wiping elements disposed in close proximity to one another and disposed along at least a finger wiping path.

20 Claims, 10 Drawing Sheets

(56) References Cited

FOREIGN PATENT DOCUMENTS

| | | |
|---|---|---|
| CN | 303894432 | 10/2016 |
| CN | 206042108 U | 3/2017 |
| CN | 207504951 U | 6/2018 |
| CN | 207560127 U | 6/2018 |
| CN | 108273775 A | 7/2018 |
| CN | 208063295 U | 11/2018 |
| CN | 304937793 | 12/2018 |
| CN | 304970735 | 1/2019 |
| CN | 209149400 U | 7/2019 |
| EP | 004715027-0001 | 2/2018 |
| JP | 2004274688 A | 9/2004 |
| KR | 200336065 Y1 | 12/2003 |
| KR | 200409101 Y1 | 2/2006 |
| KR | 200414695 Y1 | 4/2006 |
| KR | 300919949 S | 8/2017 |
| WO | 2013175219 A1 | 11/2013 |

OTHER PUBLICATIONS

"Fashion Promotional Gift Mobile Phone Wipe Sticky Screen Cleaner", Alibaba.com, 2020, 9.

"Mobile Phone Screen Wiper, Sticky Notes Pad, Cell Phone Sticky Wiper Cleaner", Patentability Search Report, 2019, 60.

"Mobile Screen Wipes", https://orakel.com/products/promotional-products/mobile-screen-wipes, 2019, 4.

"MyLifeUNIT Fingertip Moistener for Counting Cash", Amazon.com, 2020, 7.

"Plastic Sponge Damper Pad Multicolour", Amazon.com, 2020, 4.

"Speck CandyShell Grip Case for Iphone 8 Plus, 7 Plus, 6s Plus, and 6 Plus, Grey and Blue", Walmart.com, 2019, 13.

"Speck Products Compatible Phone Case for Apple iPhone X, Presidio Grip Cse, Black/Black", Amazon.com, 2019, 16.

* cited by examiner

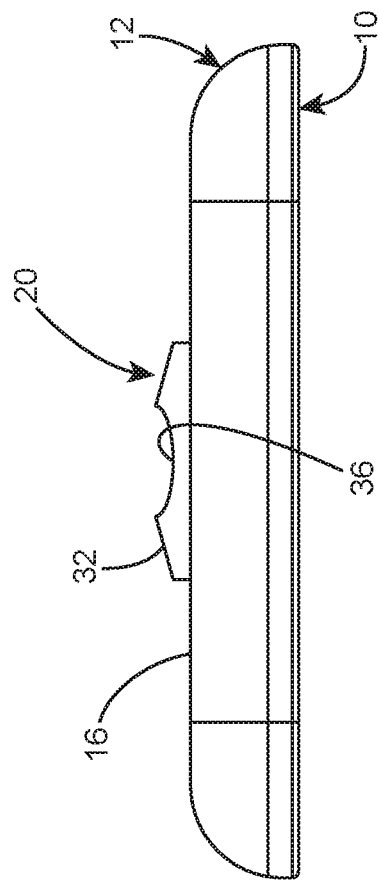
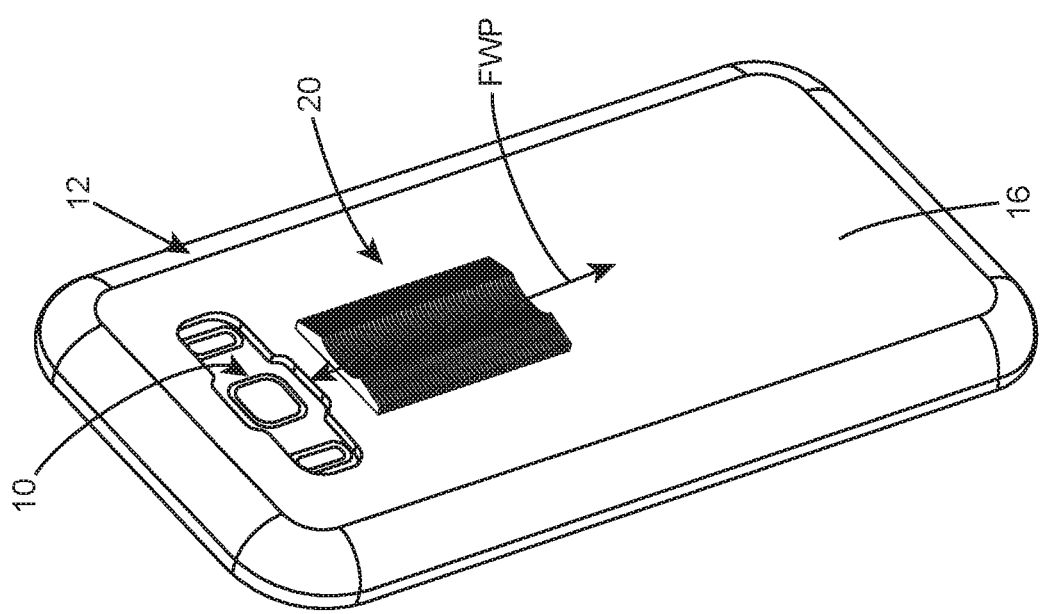

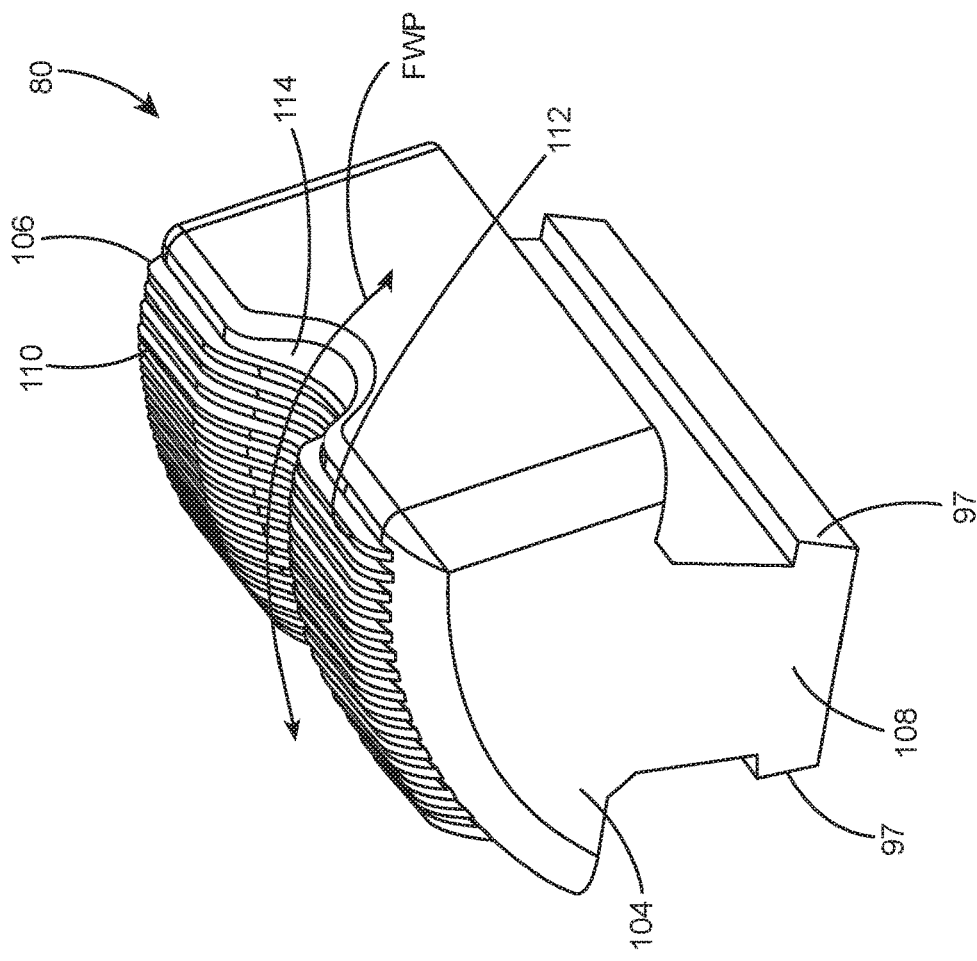
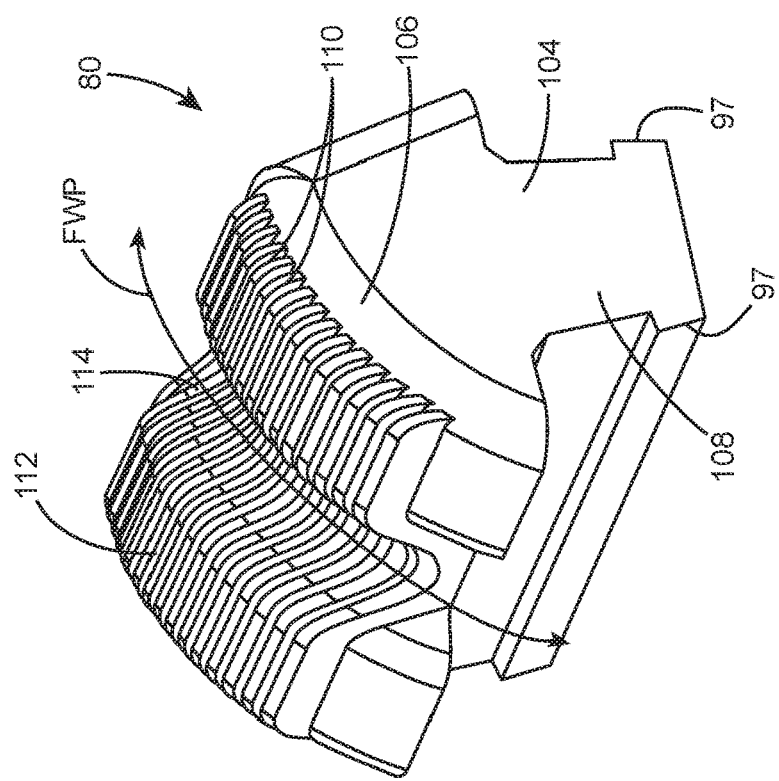

FINGER WIPER

TECHNOLOGICAL FIELD

The present disclosure is concerned with a finger wiping article, and further the disclosure is concerned with devices associated with a finger wiping article.

BACKGROUND ART

References considered to be relevant as background to the presently disclosed subject matter are listed below:
CN204046668U
CN207504951U
CN207560127U Acknowledgement of the above references herein is not to be inferred as meaning that these are in any way relevant to the patentability of the presently disclosed subject matter.

BACKGROUND

Nowadays many devices are configured with a touch-sensitive control panel operated by one's fingers and further, many devices require fingerprint input for identification purposes. These, however, require that an operating finger be clean and dry, and for that purpose, several drying and absorbing items are known in the art, configured for absorbing liquid from one's fingers.

CN204046668U discloses a heat dissipating clean mobile phone case. The mobile phone case comprises a housing covering a mobile phone. The housing comprises a shell plate making contact with the back of the mobile phone. The central portion of the shell plate is provided with a heat dissipating portion of a hollow structure. The upper end of the heat dissipating portion is provided with a rotating clamping device rotatable around the shell plate. The mobile phone case further comprises a cuboid liquid heat dissipating plate with a portion clamped in the rotating clamping device. The rotating clamping device comprises an insertion hole for fixed insertion of the liquid heat dissipating plate. The mobile phone case further comprises a cylindrical hollow finger cot disposed at the lower portion of the housing. A sponge mat is disposed in the finger cot. Through the utility model, when using the mobile phone, a user can fill the liquid heat dissipating plate with heat dissipating liquid to absorb the heat generated by the back of the mobile phone and reduce the heating of the mobile phone; and meanwhile, the user can insert a finger into the finger cot for cleaning before using the mobile phone, so that the damage to a touch screen by the finger of the user can be effectively reduced.

CN207504951U discloses a cell-phone shell convenient to unblock of wet finger line, include with smart mobile phone shape assorted cell-phone shell body, the middle part symmetry of the surface of cell-phone shell body is provided with square water absorption device, water absorption device sets up in the recess that suits rather than the shape in the smart mobile phone main part, the internal diameter of recess is greater than water absorption device's external diameter, water absorption device is the cotton that absorbs water, water absorption device's center of a circle department is provided with a stand downwards, the end of stand is equipped with the screw thread, the middle part of recess is equipped with the thread groove, water absorption device's stand spiral is screwed in the thread groove, water absorption device's top with the superficial parallel and level of smart mobile phone main part. The utility model discloses a set up water absorption device, the water with on user's the finger that can be quick blots to promote fingerprint identification's efficiency.

CN207560127U discloses a water absorption device to enhance fingerprint identification.

GENERAL DESCRIPTION

It is an object of the present disclosure to provide a finger wiping device for wiping a finger, or fingers of an individual, for use in conjunction with finger-input operated devices.

It is yet an object of the disclosure to provide a finger-input operated device configured with a finger wiping device, articulated or articulable thereto.

The term 'finger-input operated device' as used herein denotes any device that is finger/fingers operated or that requires finger input, or for operator identification.

Examples of finger-input operated device are communication devices (such as cellphones, tablets, etc.), computing devices (e.g. touch screen computers), entertainment/amusement (e.g. e-book readers, display screens, etc.), finger-print input panels, controllers, either hand-held or fixed/fixable (e.g. smart home/office appliance, machine operating controls, wet-room equipment control, etc.), navigating devices, The finger wiping device according to the present disclosure comprises a base portion and a wiping portion, said wiping portion extending over at least a portion of the base portion and configured with a plurality of flexible wiping elements extending from a top face of the base portion, said wiping elements disposed in close proximity to one another and disposed along at least a finger wiping path.

A finger-input operated device according to the present disclosure can be articulated with, either integral with or applied thereto, with a finger wiping device comprising a base portion and a wiping portion, said wiping portion extending over at least a portion of the base portion and configured with a plurality of flexible wiping elements extending from a top face of the base portion, said wiping elements disposed in close proximity to one another and disposed along at least a finger wiping path.

Any one or more of the following features, designs and configurations can be configured in a finger wiping device and a finger-input operated device, according to the present disclosure, solely or in a variety of combinations:

At least the wiping elements are made of TPR (Thermoplastic Rubber) also known as TPE (Thermoplastic Elastomer), silicone rubber, etc.;

At least the wiping elements can be made of, or coated with, or having properties of a hydrophobic material;

The a base portion and the wiping portion can be integral with one another, or articulated to one another;

The finger wiping device can be molded;

The base portion and the wiping portion can be detachably attachable to one another;

A top surface of the base portion can be configured with a gutter-like arrangement for liquid drainage there along;

The wiping elements can be in the form of bristles;

The wiping elements can be in the form of fine blades;

The blades can be disposed parallel to one another;

The blades can extend at a right angle with respect to the top face of the base portion;

A normal to the plane of the blades can extend substantially perpendicular to the finger wiping path;

Top edges of the wiping elements define a wiping surface, said surface can be configured with one or more depressions, defining a finger wiping path;

The wiping surface extending at a surface defined by the top edge of the wiping elements can have a trough-like shape, suited for passing there along a fingertip;

The wiping surface can be configured for partially embracing at least a bottom and tip portion of a finger displacing there along finger wiping path;

The profile of the wiping elements can be identical to one another, so as to give rise to a flat surface, or the profile of the wiping elements can gradually change, giving rise to a patterned wiping surface;

Density of the wiping elements, i.e. the distance between neighboring wiping elements, can be constant or change at least in direction of the wiping pass;

resilience of the wiping elements can be constant or be different at areas of the wiping device;

The finger wiping device can be configured for detachably attaching to a surface of a finger-input operated device;

The finger wiping device can be configured for detachably attaching to an accessory of a finger-input operated device;

The finger wiping device can be configured for detachably attaching to a surface in a wet room, such as a wall surface in a bathroom shower, a bathtub, etc.;

The finger wiping device can be configured for detachably attaching to a surface by a suction cup arrangement;

The finger wiping device can be configured for use in conjunction with a bath reading board (bath board);

The finger wiping device can be integral with or detachably attaching to the bath board;

The finger wiping device can be detachably attached by a snap arrangement;

The finger wiping device can be detachably attached by a press-fit arrangement;

The finger wiping device can be used in conjunction with a finger-input operated device;

can be articulated with or articulated to the entertainment/communication device;

The finger wiping device can be integral with or articulated to a cover of the finger-input operated device;

The finger wiping device can be attached to a surface by adhesive material;

The finger wiping device can be integral with a securing member configured for applying to a device by stretching thereover;

The finger wiping device can be articulated, integral with or integrated to a finger-input operated device support The finger wiping device can be articulated, integral with or integrated to a finger-input operated device support.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 1A is a perspective rear view of a cellular phone assembly fitted with a protecting cover, said cover configured with a finger wiping device according to an example of the disclosure;

FIG. 1B is a top view of the assembly of FIG. 1A;

FIG. 9A is a front perspective view of the finger wiping device seen in FIG. 7;

FIG. 9B is a rear perspective view of the finger wiping device of FIG. 9A, and

DETAILED DESCRIPTION OF EMBODIMENTS

Figure 2B:
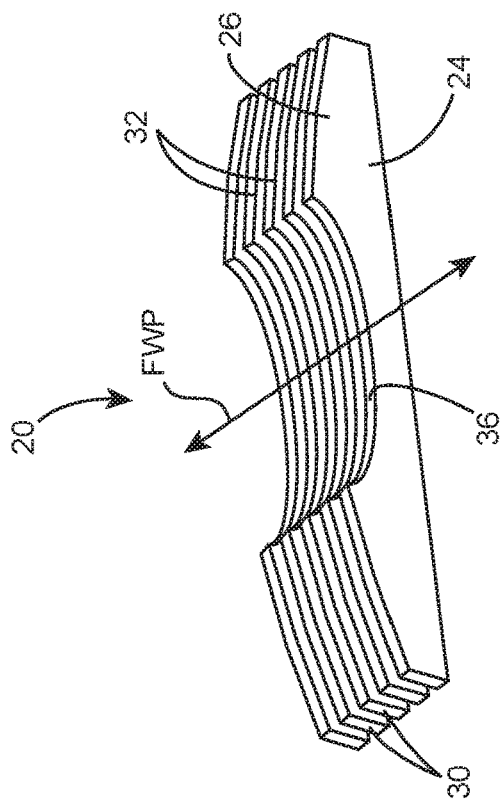
FIG. 2B is an enlarged perspective bottom view of a bottom portion of the finger wiping device of FIG. 2A.
Figure 2A:
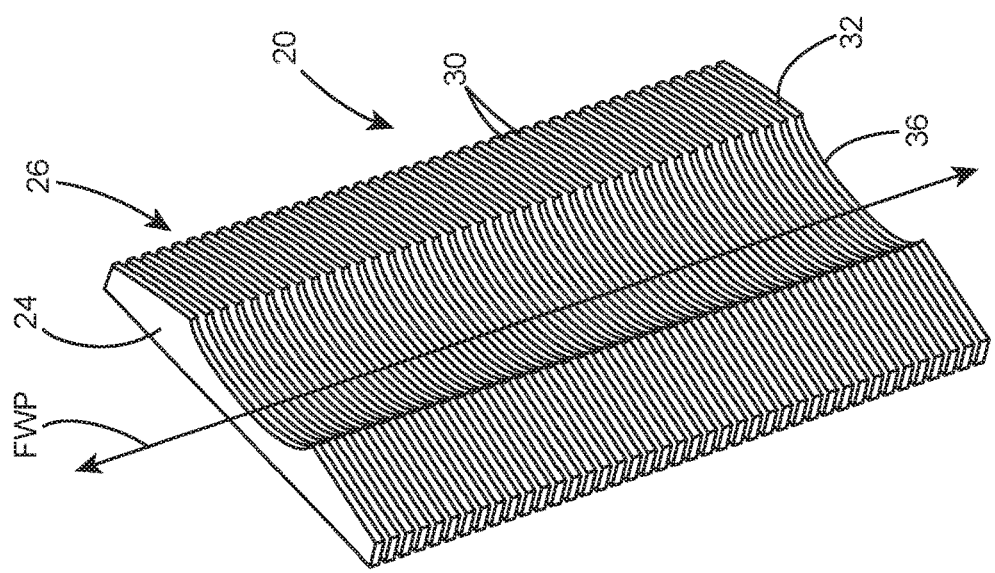
FIG. 2A is an enlargement of the finger wiping device seen in FIG. 1A.
Figure 1C:
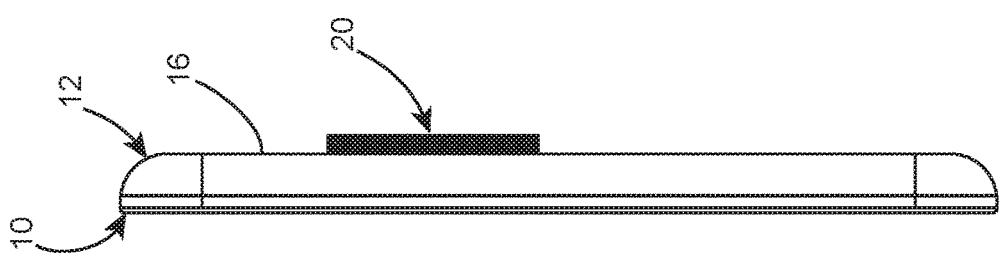
FIG. 1C is a side view of the assembly of FIG. 1A.

Attention is first directed to FIGS. 1A to 2B of the drawings, illustrating a finger-input operated device which in the present example is cellular phone generally designated 10 comprising a touch screen 11 (FIGS. 3A and 3C), and articulated thereto, e.g. by stretching thereover, there is a protective cover generally designated 12.

A back face 16 of the cover 12 is configured with a finger wiping device generally designated 20, according to an example of the present disclosure. The finger wiping device 20 is integrally formed with the cover 12, though according to an example of the disclosure (not shown), the finger wiping device can be attached, fixedly or detachably, to s surface of the cover, e.g. by adherence, by suction cups, by a hook and pile fastener (Velcro™), etc. The finger wiping device 20 is positioned at a location easily accessible by a user holding the phone 10.

The finger wiping device 20 is made of TPR (Thermoplastic Rubber) also known as TPE (Thermoplastic Elastomer), silicone rubber, etc. and comprises a base portion 24 (which as mentioned hereinabove, can be integral with or integrated with a surface), and a wiping portion 26. In the present example the wiping portion 26 extends over the entire base portion 24, though according to other examples (not shown) the wiping portion 26 can extend over a portion of the base portion.

Figure 4:
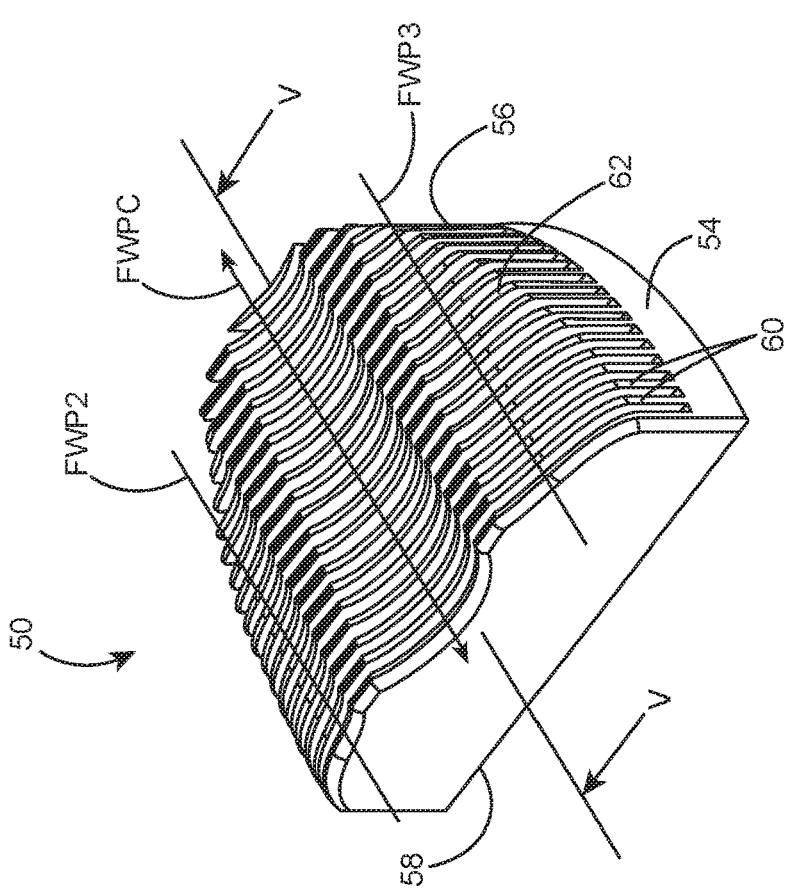
FIG. 4 is a perspective view of a finger wiping device according to another example of the disclosure.
Figure 5C:
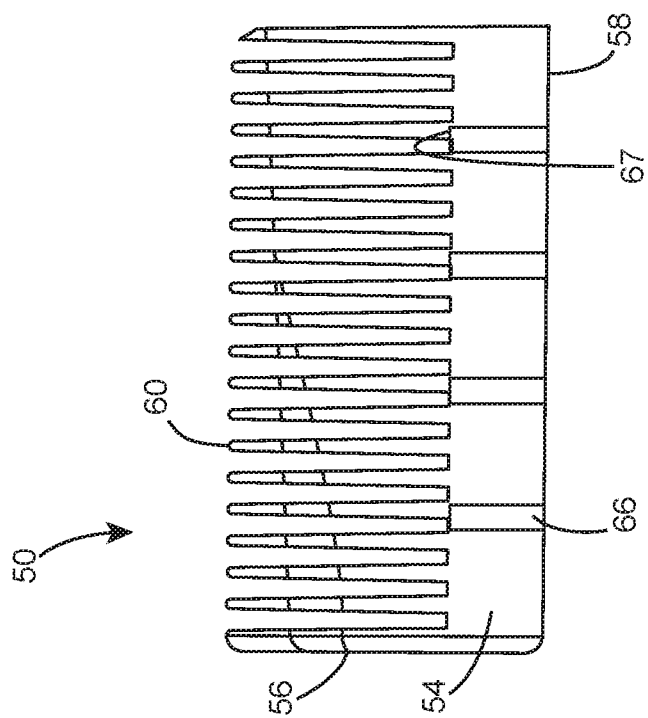
FIG. 5C is a side view of FIG. 5B.
Figure 5B:
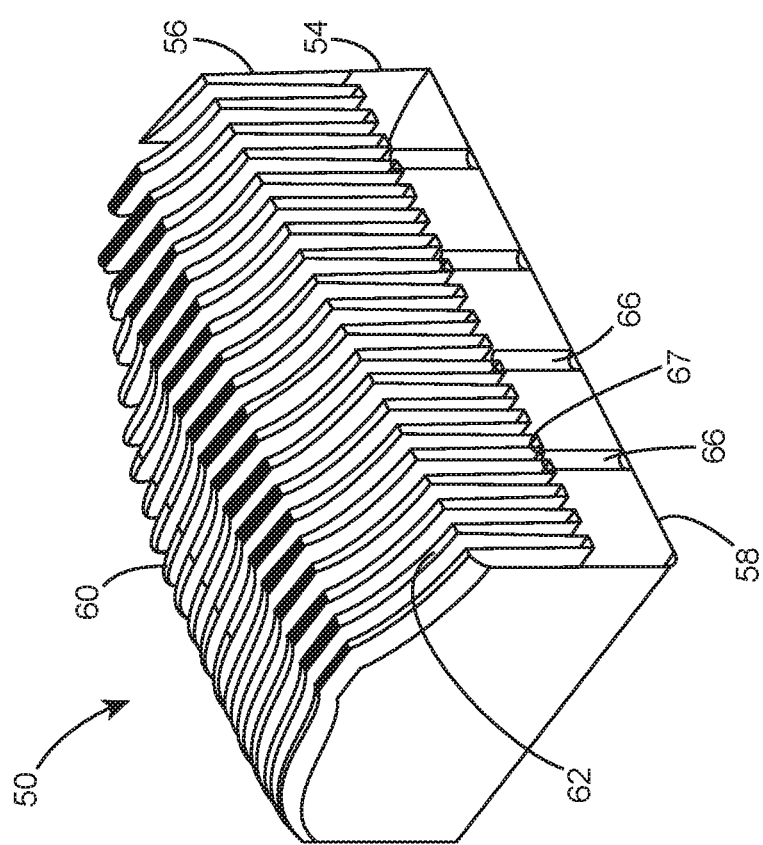
FIG. 5B is a section taken along line V-V in FIG. 4.

In the present example, since the finger wiping device 20 is integral with the cover 12, the base portion of the finger wiping device is merged with the cover 12, wherein the wiping portion 26 comprises a plurality of thin, flexible wiping elements 30 emerging from the cover 12, wherein said wiping elements 30 are blade/fin—like elements, though other configurations can be applies as well, e.g. fine bristle—like wiping elements (not shown). However, according to other examples, e.g. as in the example illustrated in FIG. 4, the wiping elements extend from a solid, integrated base portion, as will be explained hereinafter. Thus, the finger wiping device 20 of FIGS. 1 and 2 could have just as well be configured with a solid, integrated base portion (as in the example of FIG. 4).

The wiping elements 30 of finger wiping device 20 are parallely disposed, equally distanced from one another and are identically shaped.

Furthermore, the wiping elements 30 of finger wiping device 20 are disposed in close proximity to one another and wherein top edges 32 of the wiping elements define together a wiping surface with a finger wiping path FWP extending across the wiping elements 30. In the illustrated example the finger wiping path has a central depressed, trough-like portion 36, shaped and sized to partially embrace a fingertip when slide there along (FIG. 3B). It is appreciated that the wiping surface can assume different shapes and sized and can be configured with one or more finger wiping path FWP.

Figure 3A:
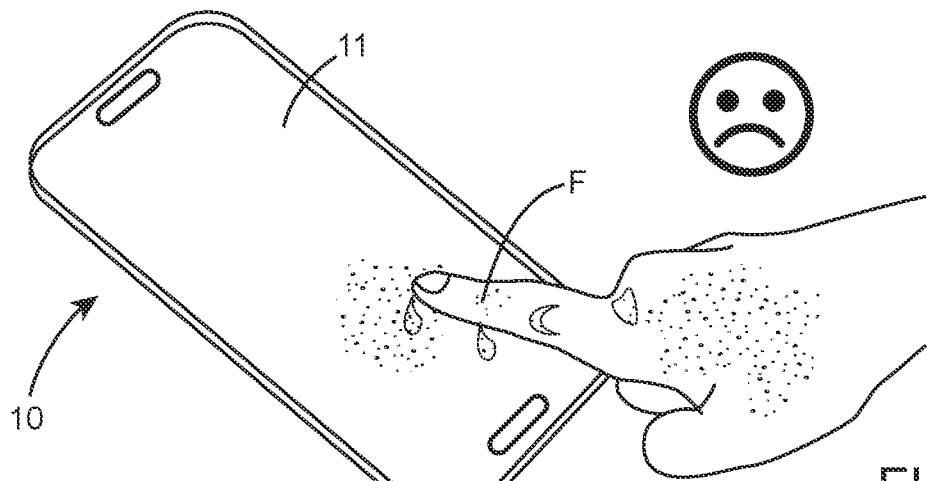
FIGS. 3A to 3C exemplify how the finger wiping device of FIG. 1A is used with respect to the cellular phone.
Figure 3B:
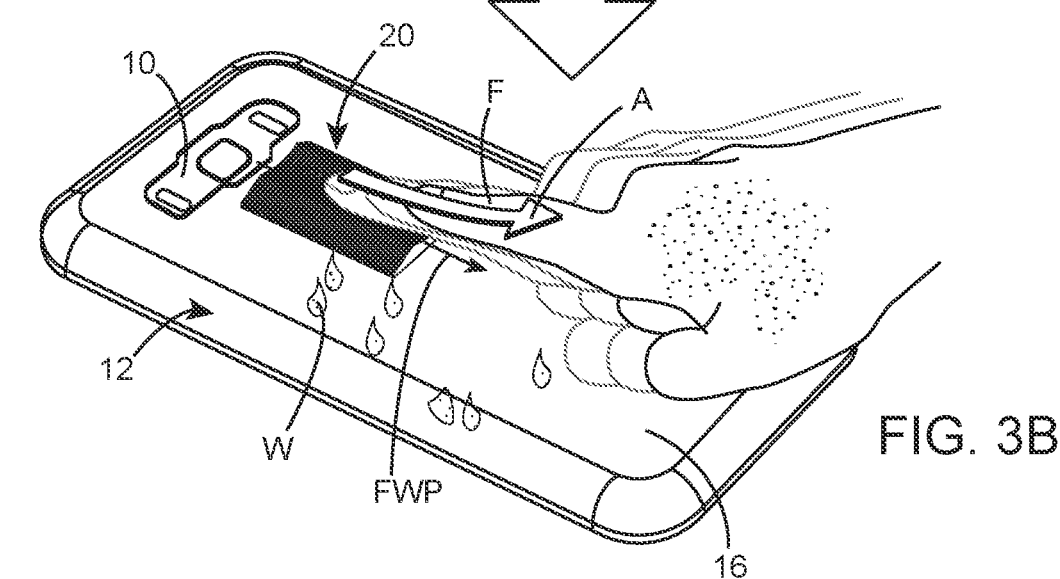
Figure 3C:
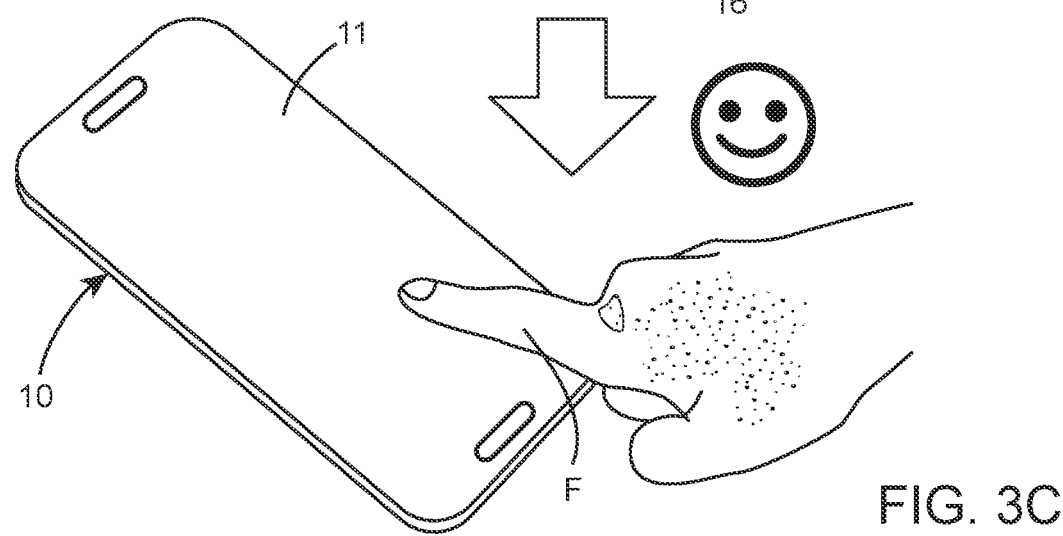
Figure 5A:
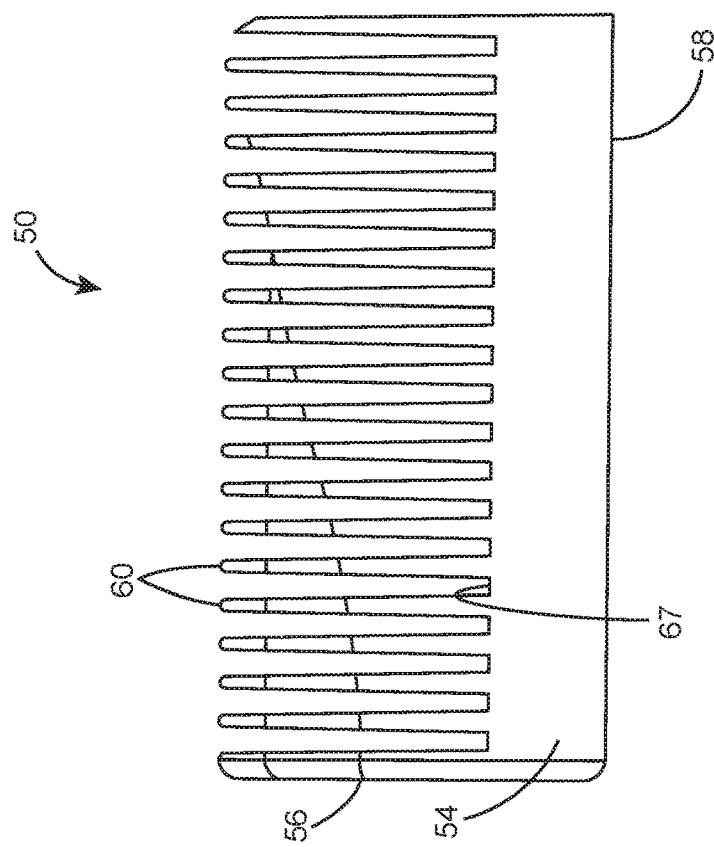
FIG. 5A is a side view of the finger wiping device seen in FIG. 4.

With further reference made to FIGS. 3A to 3C, the cellular phone 10 is seen, in which at FIG. 3A an individual is attempting to operate the touch screen 11 of the cellular phone 10 with a wet finger F, resulting in a failure attempt ⊗, owing to the wet finger F. FIG. 3B illustrates how the finger wiping device 20 is in use, wherein the individual passes the wet finger F over the wiping elements 30, along the finger wiping path FWP, in direction of arrow A, resulting in water droplets W draining from the finger and thus drying at least the fingertip F, such that it can now be used for successful ☺ operating the touch screen 11 of the cellular phone 10 (FIG. 3C).

Turning now to FIGS. 4 and 5A to 5C, there is illustrated another example of a finger wiping device according to the present disclosure, generally designated 50, detached from any surface. The finger wiping device 50 is also made of TPR (Thermoplastic Rubber) also known as TPE (Thermoplastic Elastomer), silicone rubber, etc., and comprises a base portion 54 and a wiping portion 56, wherein the wiping portion 56 extends integrally from the entire base portion 54.

The base portion 54 of finger wiping device 50 has a bottom surface 58 attachable (fixedly or detachably) to any surface (e.g. of a finger-input operated device, a wet room surface, a utility unit surface etc.) e.g. by adherence, by suction cups, by a hook and pile fastener (Velcro™), etc.

The wiping portion 56 comprises a plurality of thin, flexible wiping elements 60 emerging from base portion 54, wherein said wiping elements 60 are blade/fin—like elements, slightly tapering, thus having a thin, fine resilient top edge. It is seen that the wiping elements 60 are parallely disposed, equally spaced from one another and unlike the previous example are not identical in shape. Also seen, the top edges 62 of the wiping elements 60 define together a wiping surface with a central finger wiping path FWPC extending centrally over the wiping elements 60, and two secondary, side finger wiping paths FWR2 and FWP3, wherein at the present example all three finger wiping paths are parallel to one another. The central finger wiping path FWPC has a distinct trough-like cross-section, and the two side finger wiping paths are less distinct.

The base portion 54 is configured with several draining ports 66 (only four seen, though one or more draining ports can be configured between each wiping blade) extending from a top surface 67 of the base portion, to the bottom surface 58. Furthermore, the draining port can extend towards the bottom surface 58 of the base portion 54, or towards a side portion thereof (not shown).

Figure 6A:
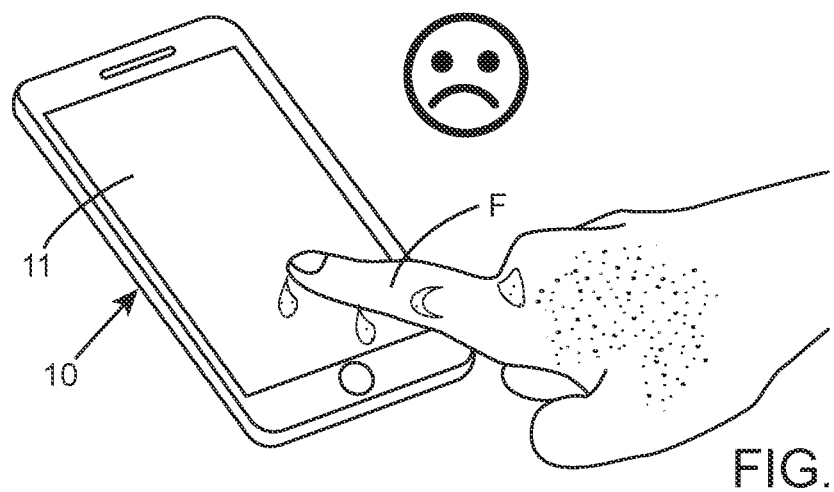
FIGS. 6A to 6C exemplify how the finger wiping device of FIG. 4 is used with respect to a finger-input operated device.
Figure 6B:
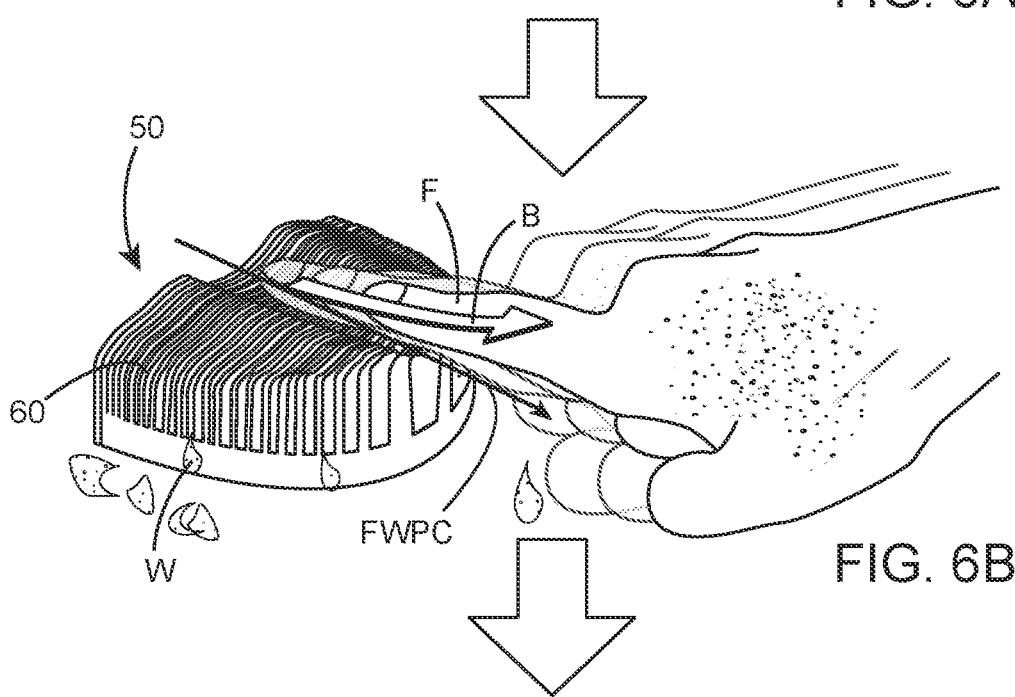
Figure 6C:
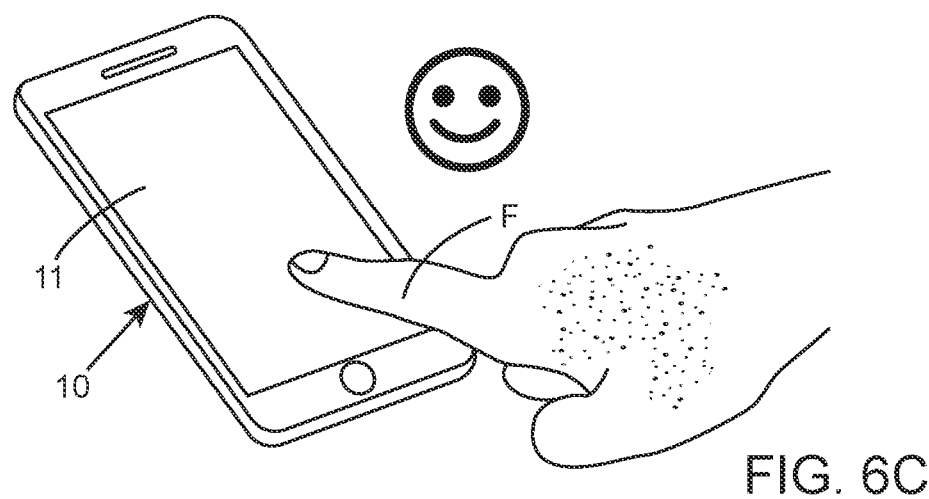
Figure 8A:
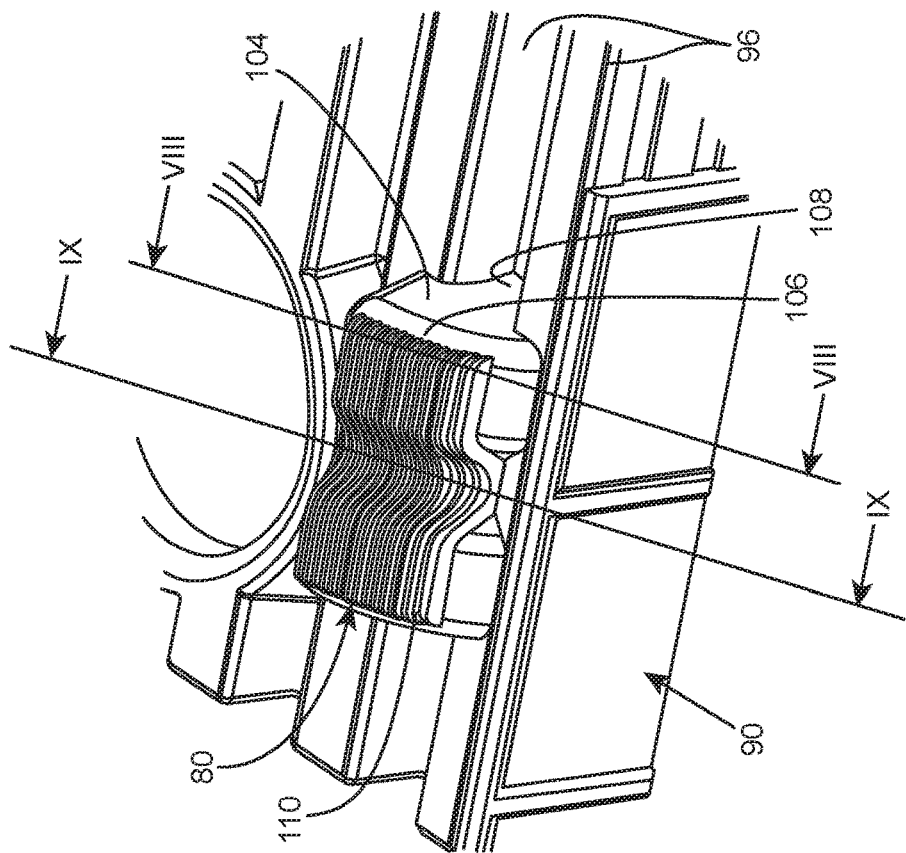
FIG. 8A is an enlargement of the portion marked VII in FIG. 7.
Figure 7:
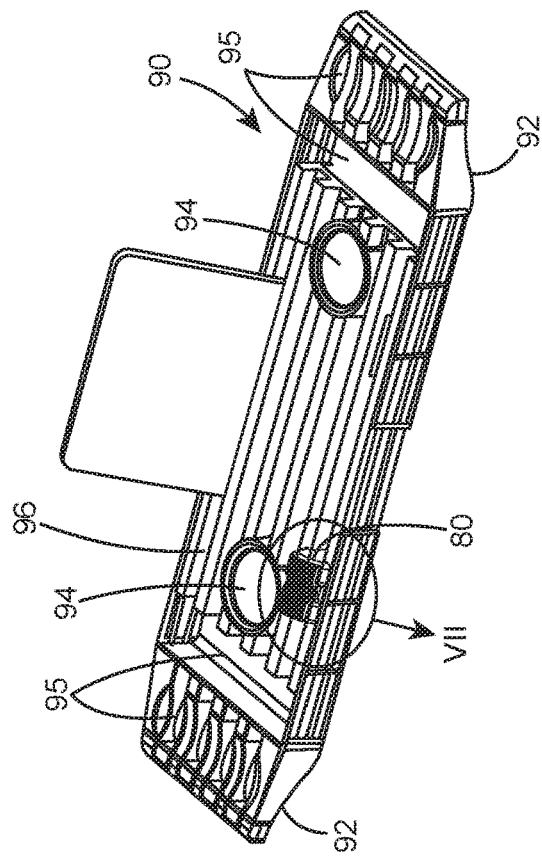
FIG. 7 is a perspective view of a bath board/tray supporting a finger-input operated device being a tablet, and configured with a finger wiping device according to the disclosure.
Figure 8C:
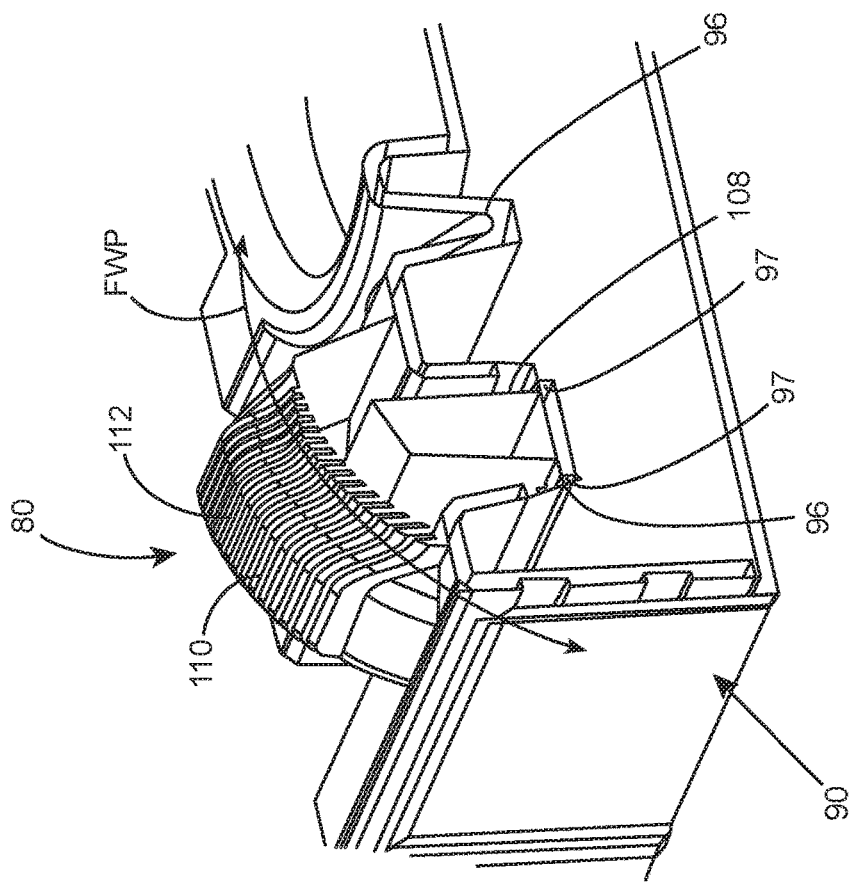
FIG. 8C is sectioned view along line IX-IX in FIG. 8A
Figure 8B:
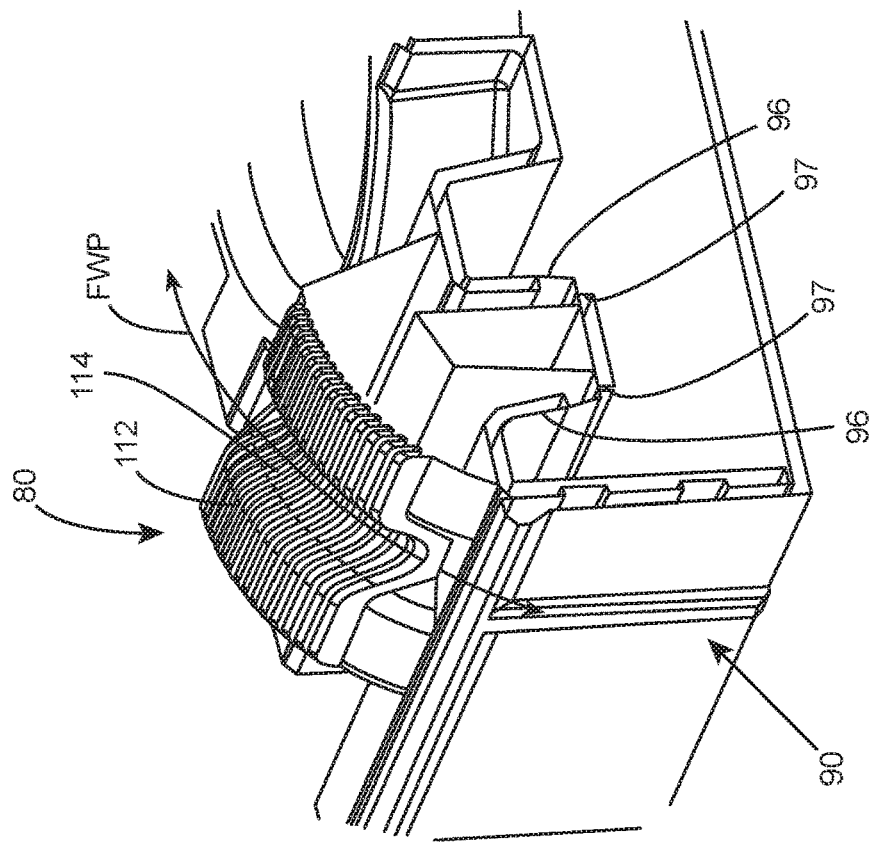
FIG. 8B is sectioned view along line VIII-VIII in FIG. 8A.

The finger wiping device 50 is used similarly to the finger wiping device 20 of the previous example, however, in the present example it is disposed detached from the cellular phone 10. With further reference to FIGS. 6A to 6C, the cellular phone 10 is seen, in which at FIG. 6A an individual is attempting to operate the touch screen 11 of the cellular phone 10 with a wet finger F, resulting in a failure attempt ⊗, owing to the wet finger F. FIG. 6B illustrates how the finger wiping device 50 is in use, wherein the individual passes the wet finger F over the wiping elements 60, along the central finger wiping path FWPC, in direction of arrow B, resulting in water droplets W draining from the finger and thus drying at least the fingertip F, such that it can now be used for successful ☺ operating the touch screen 11 of the cellular phone 10 (FIG. 6C).

Figured 7 to 9 illustrate yet an example of a finger wiping device 80 according to the present disclosure, configured for use in conjunction with a bath board/tray generally designated 90. Bath board 90 is a generally flat article comprising two spaced apart side flaps 92 configured for resting over top side edges of a bathtub or the like (not shown). A top surface is configured with different utility/convenience article holders, such as cup holders 94, toiletries holders 95 and a plurality of entertainment holder slots 96 for supporting a book, an e-reader, a tablet, a cellular phone and the like, etc. Finger wiping device 80 is snap fitted over a top surface of the bath board 90, in between slots 96, as will be discussed herein below, however being readily detachable therefrom.

Similar to the previous examples, finger wiping device 80 is also made of TPR (Thermoplastic Rubber) also known as TPE (Thermoplastic Elastomer), silicone rubber, etc., and is a solid integral device comprising a base portion 104 and a wiping portion 106, wherein the wiping portion 106 extends integrally from the entire base portion 54, and wherein the base portion 104 is configured at a bottom thereof with an articulation portion 108 for detachably attaching to a utility unit (e.g. bath board 90).

The wiping portion 106 comprises a plurality of thin, flexible wiping elements 110 emerging from base portion 104, wherein said wiping elements 110 are blade/fin—like elements having a thin, fine resilient top edge. It is seen that the wiping elements 110 are parallely disposed, equally spaced from one another and together define an arc-shape wiping surface 112, with a deep, trough-like finger wiping path FWP extending centrally over the wiping elements 110.

Attaching the finger wiping device 80 is facilitated by snap-pressing the articulation portion 108 in between neighboring slots 96, or a dedicated receptacle (not shown) at the bath board 90, such that side flaps 97 arrest under the slots 96, and the finger wiping device 80 it is firmly secured.

The finger wiping device 80 is used similarly as explained in connection with the previous examples.

Figure 10:
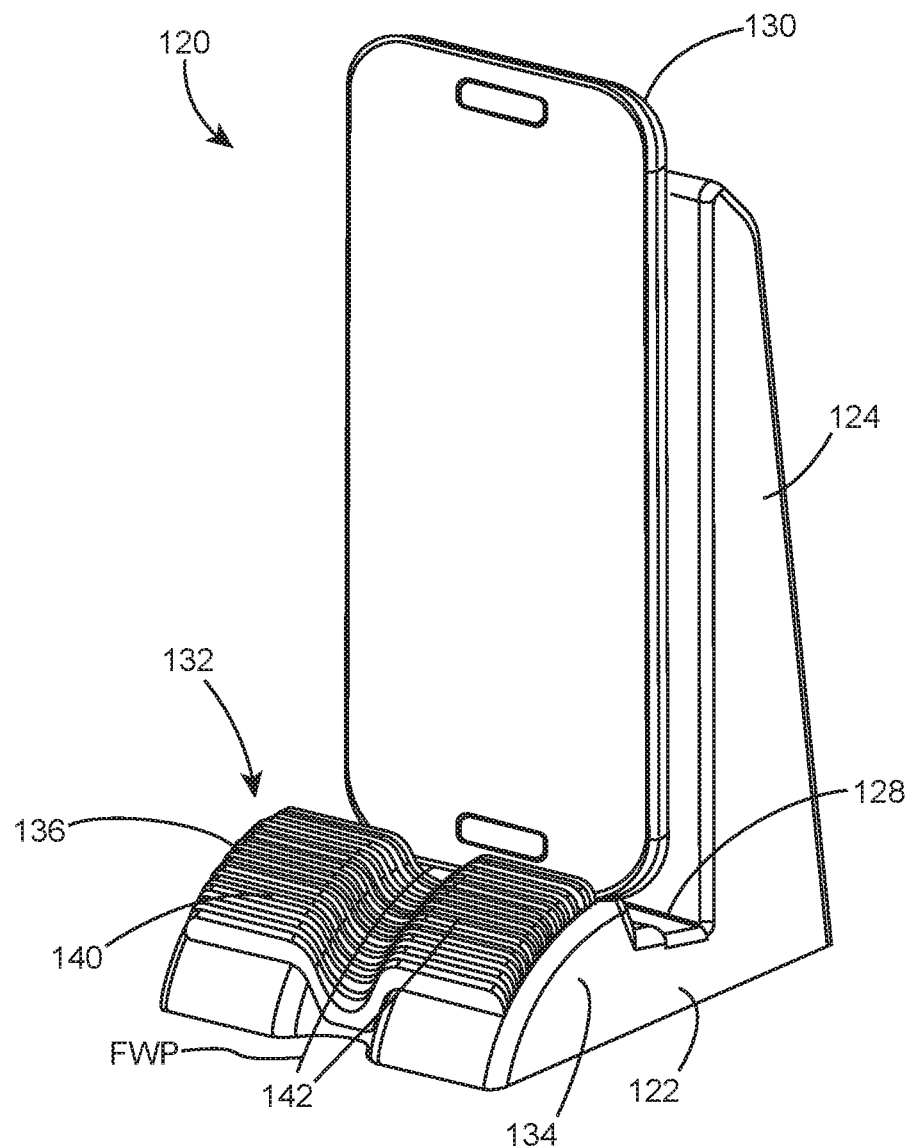
FIG. 10 is a perspective view of a cellular phone desktop support, configured with a finger wiping device according to yet an example of the disclosure.

Turning now to FIG. 10 there is illustrated a desktop cellular support generally designated 120, the support having a generally L-shaped shape comprising a support base 122 and a slightly inclined back support 124, with a recess 128 shaped for receiving a cellular phone 130. The support base is integrally configured with a finger wiping device generally designated 132, and comprising a base portion 134 and a wiping portion 136. Similar to the previous examples, wiping portion 136 comprises a plurality of thin, flexible wiping elements 140 emerging from the base portion 134, wherein said wiping elements 140 are blade/fin—like elements having a thin, fine resilient top edge. The wiping elements 140 are parallely disposed, equally spaced from one another and together define an arc-shape wiping surface 142, with a deep, trough-like finger wiping path FWP extending centrally over the wiping surface 142.

The support 120 thus serves for supporting the cellular phone 130 at an upright position, and yet serves for finger wiping as explained herein before in connection with previous examples.

The invention claimed is:

1. A finger wiping device, comprising:
   a base portion; and
   a wiping portion extending over at least a portion of the base portion, the wiping portion configured with a plurality of flexible wiping elements extending from a top face of the base portion, said plurality of flexible wiping elements disposed in close proximity to one another and disposed along at least a finger wiping path;
   wherein top edges of the plurality of flexible wiping elements define a wiping surface, said wiping surface being configured with one or more depressions, defining said finger wiping path.

2. The finger wiping device according to claim 1, wherein at least the plurality of flexible wiping elements are made of resilient soft thermoplastic material.

3. The finger wiping device according to claim 1, wherein at least the plurality of flexible wiping elements are made of, coated with, or have properties of a hydrophobic material.

4. The finger wiping device according to claim 1, wherein the base portion and the wiping portion are integral with one another, or articulated to one another.

5. The finger wiping device according to claim 1, wherein the finger wiping device is a molded article.

6. The finger wiping device according to claim 1, wherein the base portion and the wiping portion are detachably attachable to one another.

7. The finger wiping device according to claim 1, wherein the base portion has a top surface configured with a gutter-like arrangement for liquid drainage therefrom.

8. The finger wiping device according to claim 1, wherein the plurality of flexible wiping elements are bristles.

9. The finger wiping device according to claim 1, wherein the plurality of flexible wiping elements are fine blades.

10. The finger wiping device according to claim 1, wherein the plurality of flexible wiping elements are disposed parallel to one another.

11. The finger wiping device according to claim 1, wherein the plurality of flexible wiping elements extend at a right angle with respect to the top face of the base portion.

12. The finger wiping device according to claim 1, wherein a normal to a plane of the plurality of flexible wiping elements is disposed substantially perpendicular to the finger wiping path.

13. The finger wiping device according to claim 1, wherein the wiping surface extending at a surface defined by the top edge of the plurality of flexible wiping elements has a trough-like shape, suited for passing there along a fingertip.

14. The finger wiping device according to claim 13, wherein the wiping surface is configured for partially embracing at least a bottom and tip portion of a finger displacing there along said finger wiping path.

15. The finger wiping device according to claim 1, wherein the plurality of flexible wiping elements have a density that is constant.

16. The finger wiping device according to claim 1, configurable for detachably attaching to a surface of a finger-input operated device.

17. The finger wiping device according to claim 1, configurable for detachably attaching to an accessory of a finger-input operated device.

18. The finger wiping device according to claim 1, configurable for detachably attaching to a surface in a wet room.

19. A finger-input operated device configurable with a finger wiping device comprising a base portion and a wiping portion, said wiping portion extending over at least a portion of the base portion and configured with a plurality of flexible wiping elements extending from a top face of the base portion, said plurality of flexible wiping elements disposed in close proximity to one another and disposed along at least a finger wiping path;
   wherein top edges of the plurality of flexible wiping elements define a wiping surface, said surface being configured with one or more depressions, defining a finger wiping path.

20. A finger wiping device, comprising:
   a base portion; and
   a wiping portion extending over at least a portion of the base portion, the wiping portion configured with a plurality of flexible wiping elements extending from a top face of the base portion, said plurality of flexible wiping elements disposed in close proximity to one another and disposed along at least a finger wiping path;
   wherein top edges of the plurality of flexible wiping elements define a wiping surface, said surface being configured with one or more depressions, defining said finger wiping path;
   wherein the wiping surface extending at a surface defined by the top edge of the wiping elements has a trough-like shape, suited for passing there along a fingertip.

* * * * *